(12) United States Patent
Kawasaki et al.

(10) Patent No.: US 6,282,543 B1
(45) Date of Patent: Aug. 28, 2001

(54) DATABASE SEARCH AND DISPLAY METHOD AND DATABASE SEARCH SYSTEM

(75) Inventors: Shigehito Kawasaki; Hideyuki Fukuoka; Hiromi Mizuno, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/157,259

(22) Filed: Sep. 18, 1998

(30) Foreign Application Priority Data

Sep. 22, 1997 (JP) .................................... 9-256967

(51) Int. Cl.[7] ............................ G06F 17/30; G06F 17/60; H04N 7/10
(52) U.S. Cl. .................... 707/10; 707/3; 705/14; 705/27; 709/232; 348/9; 348/13
(58) Field of Search ....................... 348/9, 13; 707/10, 707/3; 705/14, 27; 709/232

(56) References Cited

U.S. PATENT DOCUMENTS

| | | | |
|---|---|---|---|
| 5,652,615 | * | 7/1997 | Bryant et al. ........................ 348/9 |
| 5,740,549 | * | 4/1998 | Reilly et al. ........................ 705/14 |
| 5,774,170 | * | 6/1998 | Hite et al. ........................ 348/9 |
| 5,838,790 | * | 11/1998 | McAuliffe et al. ..................... 380/4 |
| 5,913,040 | * | 6/1999 | Rakavy et al. ....................... 709/232 |
| 5,918,214 | * | 6/1999 | Perkowski ........................... 705/27 |
| 5,933,811 | * | 8/1999 | Angles et al. ....................... 705/14 |

FOREIGN PATENT DOCUMENTS

05143653 * 6/1993 (JP) ........................................ 15/40

* cited by examiner

*Primary Examiner*—Thomas Black
*Assistant Examiner*—Frantz Coby
(74) *Attorney, Agent, or Firm*—McGuireWoods LLP

(57) ABSTRACT

A push type information providing service on the Internet. When information arranged on a time axis and retrieved is output time to time, the information is output/displayed in sequence on the time axis along a scenario described with position information of a plurality of data stored in databases distributed on the network. In displaying the position information of the data, secondary information such as advertisement, etc., is inserted onto the time axis of the position information of the retrieved main information along the described scenario. Main information sequence control information for controlling an output/display sequence of the main information and secondary information sequence control information are provided separately and the secondary information is inserted into the main information on the basis of the presenting frequency control information and output/displayed. Thus, it is possible to freely insert/output the secondary information such as advertisement information. Further, it is possible to easily update/edit the scenario for arranging the retrieved information on the time axis and inserting the secondary information thereto.

6 Claims, 7 Drawing Sheets

DATABASE SEARCH AND DISPLAY METHOD AND DATABASE SEARCH SYSTEM

BACKGROUND OF THE INVENTION

The present invention claims priority from Japanese Patent Application No. 9-256967 filed Sep. 22, 1997, which is incorporated herein by reference.

1. Field of the Invention

The present invention relates to a technology for searching databases distributed on a network and outputting retrieved data. Particularly, the present invention is utilized in a technique for retrieving data of databases distributed on the Internet and outputting the retrieved data on a time axis sequentially and in a technique for inserting secondary information such as advertisement into main information to be retrieved in synchronism with an output/display of the main information and providing the main information together with the secondary information.

2. Description of Related Art

There has been a technique for searching databases distributed on a network and displaying retrieved information. The WWW (World Wide Web) utilizing the Internet is an example of such technique, with which a user can easily and inexpensively obtain a desired information, and is becoming popular worldwide rapidly.

In the WWW, search software for performing a keyword search such as "Yahoo!" is well known and widely used as directory services for notifying database to be accessed.

These directory services are techniques for, in order to acquire data on the user side, voluntarily searching aimed data and acquiring a position information of the aimed data. However, this technique is not easy for users who are unfamiliar with computer operation.

On the other hand, the directory service so-called "push type" service, in which information is distributed from the database side to the user, was started. In this technique, information assigned by the user is automatically sent from the database to the user terminal (client) when the user accesses a specific database (server). There are various constructions of the push type service technique.

Inventors of the present invention have proposed a database search method and apparatus in which a user takes in position information of a necessary database without necessity of voluntary computer operation by himself and the information is displayed on a display screen of an operation terminal (Japanese Patent Application No. Hei 8-297317).

In this technique, a directory information server holds scenario information composed of information to be distributed to users and arranged on a time axis and, in response to an access from a database searcher, automatically distributes a sequence of position information (URL) assigning a position in which a file to be displayed exists and time interval thereof to the database searcher along the scenario information.

FIG. 1 shows an example in which this technique is applied to the Internet. In FIG. 1, a directory information provider 30 stores a scenario information 40 composed of URL and information assigning a time interval of transmission of URL. The directory information provider 30 transmits URL arranged on a time axis described in the scenario information 40 to a database searcher 20 according to the assigned time interval. In the database 20, a browser controller 22 receives URL from the directory information provider 30 and outputs it to a WWW browser 21. The WWW browser 21 accesses a corresponding WWW server 61, 62, ..., or 6n on the Internet on the basis of the input URL, down-loads a home page of the assigned URL and displays it on the WWW browser.

FIG. 2 is a flowchart of the processing in the directory information provider 30. The directory information provider 30 transmits position information (URL) to the database searcher 20 according to the time interval described in the scenario information 40.

As mentioned above, according to the database search method utilizing WWW and device therefor proposed by the inventors, the user can watch and hear the information of the home page sent from the WWW server by watching a screen of the WWW browser as if he watches a television screen.

That is, according to the database search method utilizing WWW and device therefor proposed by the inventors, the user can watch a screen of the WWW browser as if he watches a television screen and the information provider can show the user an information which the information provider wants to show in a sequence desired by the information provider.

However, in such technique, there is a problem that, when a scenario information is updated/changed in order to insert any secondary information into the information to be retrieved and displayed, the update/change of the scenario information is complicated and not easy.

For example, when an advertisement is to be shown in the above mentioned directory service, an advertisement URL must be described in the scenario information. However, the advertisement URL is to be changed from time to time and, in order to change the advertisement, the scenario must be changed in the body of the scenario information at every timing of the insertion of the advertisement. Particularly, the work load for changing the scenario information every time when the advertisement information is to be inserted, while there is no change of the information (referred to as "main information" or "body information") to be output/displayed for the user, is very heavy. Therefore, the utility of the directory information providing service is restricted and popularization thereof is prevented. Further, it becomes difficult to utilize advertisement on the Internet and database providing business free of charge is limited.

SUMMARY OF THE INVENTION

An object of the present invention is to provide a push type information providing technique in which secondary information is inserted into main information and the main information with the secondary information is output and displayed and which is capable of easily updating/changing scenario information.

Another object of the present invention is to provide a push type information providing technique with which directory information services by which an information provision similar to that in a television broadcasting by automatically inserting secondary information such as advertisement is possible.

A further object of the present invention is to provide a push type information providing technique capable of providing directory information services with which the freedom of secondary information such as advertisement can be improved.

Another object of the present invention is to provide a push type information providing technique capable of providing directory information services which is capable of performing an insertion of secondary information in predetermined time unit or according to the number of pictures displayed on a screen.

Another object of the present invention is to provide a push type information providing technique capable of providing directory information services which can forcibly display information to be inserted into the main information, such as advertisement, to contemplate benefits of an advertisement provider.

In order to achieve the above objects, according to a first aspect of the present invention, a database search/display method comprises the steps of retrieving information of databases distributed on a network and outputting/displaying the retrieved information according to an information presenting sequence control information for arranging/outputting the retrieved information on a predetermined time axis, wherein the information presenting sequence control information contains a main information presenting sequence control information, a secondary information presenting sequence control information and an insert control information for controlling an insertion timing of the secondary information and the secondary information is inserted onto the time axis for the main information according to the insert control information.

The information presenting sequence control information is the so-called scenario information containing a file position information URL and time information describing a time interval of a transmission of the URL and describing an outputting/displaying sequence of the information of the databases. In the present invention, the scenario information contains the main information presenting sequence control information describing the output/display sequence of the main information, the secondary information presenting sequence control information describing the output/display sequence of the secondary information and the insert control information describing the inserting timing the secondary information into the main information and the secondary information is inserted into the main information and displayed according to the insert control information. A user can watch information acquired on the basis of the scenario information as if it is an image on a television receiver or an image of a picture-card show.

Since, in the present invention, an output/display scenario of the main information and an output/display scenario of the secondary information are produced separately, it is possible to change/update these scenarios separately. Therefore, it is possible to update the secondary information scenario frequently independently from the update of the main information scenario, so that maintenance thereof is facilitated. Further, it is possible to easily replace the secondary information without requiring any change of the main information scenario of the database providing the latter.

The insertion control information for controlling the insertion timing of the secondary information into the main information can describe the insertion timing of the secondary information with using the output/display time interval of the main information and the frequency of insertion of the secondary information can be described with an amount of output/displayed main information, for example, the number of pictures output/displayed. As described above, the insert control information may be the output/display time interval of the main information or the frequency information corresponding to the amount of information or may be described with insertion time point related to content of the main information.

Further, it is possible to provide a plurality of secondary information series arranged on the time axis. In such case, the insert control information may also describe which secondary information of the plurality of secondary information series is inserted into the main information. With such description, a variety of outputs/displays of secondary information become possible with respect to the main information.

In the case where the secondary information is inserted into the main information with a predetermined time interval, the insertion is performed every time assigned by the presenting control information while counting time by a timer. The thus inserted secondary information is output/displayed between portions of the main information which are being output/displayed. Alternatively, it is possible to display the secondary information according to the number of output/display fields of the main information (the number of displayed pictures). The traffic of transmission line of the network depends upon time. Since, even if the data of URL is prefetched on the basis of the scenario, time required for acquiring the data varies, the definition of the insert frequency by time interval is not always suitable. Therefore, the secondary information is preferably inserted into the main information and displayed according to the amount of information of the main information to be output/displayed (for example, the number of output pictures or the number of bits thereof) when the traffic of the transmission line is busy.

Incidentally, when predetermined position information which is retrieved by a user according to the scenario is being displayed, it is possible to forcibly continue the display of the information by inhibiting the user to invalidate the display thereof. This can be achieved by preliminary programming such that an operation of a control panel of a display screen for the predetermined position information is invalidated so that a fast feed or jump for the predetermined position information is prevented. With this scheme, it is possible to display a secondary information such as advertisement to the user without fail to thereby keep the benefit of advertisement provider.

According to a second aspect of the present invention, a directory information provider which is provided in a network comprises position information memory means for storing position information of a plurality of data stored in databases distributed in the network and position information presenting sequence control means for arranging/outputting the position information on a time axis, wherein the position information memory means stores position information of main information and position information of secondary information inserted into the position information of the main information and the position information presenting sequence control means includes means for inserting the position information of the secondary information into the position information of the main information.

The directory information provider provided on the network further comprises means for storing scenario information which is information presenting sequence control information containing position information of the main information and the secondary information and describing sequences of the main information and the secondary information and the insertion timing of the secondary information. The directory information provider inserts the position information of the secondary information on the time axis of the position information of the main information on the basis of the scenario information and sends the position information of the secondary information inserted into the position information of the main information to the database searcher in the network. The database searcher retrieves and displays data by searching a predetermined position information of the database provider in the network according to the position information from the directory information provider. The database searcher has a function of prefetching an information which is being displayed. That is, it has a prefetched function of acquiring data by accessing the position information of the main information or the secondary information precedent to the information which is being displayed and the data thus taken in is displayed to the user together with such feeling as television broadcasting.

According to a third aspect of the present invention, a database search system comprises a directory information provider. The directory provider comprises means for transmitting scenario information composed of presenting sequence control information for main information, presenting sequence control information for secondary information and presenting control information for controlling insertion timing of the secondary information into the main information to a database searcher connected to the network and the database searcher includes means for outputting/displaying the main information and the secondary information by acquiring the main information and the secondary information from the databases distributed in a network on the basis of the scenario information transmitted from the directory information provider and inserting the secondary information into the main information thus acquired.

The position information is not transmitted from the directory information provider. That is, the scenario information is down-loaded from the directory information provider to the database searcher and the database searcher acquires the position information to be retrieved from the database on the basis of the down-loaded scenario information, inserts the secondary information into the main information on the basis of the position information thus acquired and outputs/displays the main information together with the secondary information. In the database search using the network, it is rather convenient for the user to put the scenario information on the side of the database searcher which is the user terminal connected to the network and to output/display the database information retrieved on the basis of its control than to receive position information from the directory information provider every search and to retrieve data. In such case, since the update/change of the scenario information is performed on the side of the directory information provider, the updated scenario information may be acquired every update thereof by down-loading the updated scenario information to the database searcher every update. When the update is performed, it is possible to distribute the updated scenario information to the respective database searchers. Alternatively, it may be possible to store the scenario information in a portable recording medium such as floppy disk or CD and provide it to the user. In the latter case, the user can use the recording medium by installing it in the database searcher which is the user terminal.

According to a fourth aspect of the present invention, the present invention is applied to a database search system in which clients and servers are connected to the network. The directory information provider corresponds to the directory information providing server and the database searcher corresponds to the client. An operation thereof is the same as that described with respect to the third aspect of the present invention.

A fifth aspect of the present invention is an application of the present invention to the database search system in the Internet. The database search system comprises a World Wide Web database provider connected to the Internet, a directory information provider for retrieving a position information of data on the Internet and providing a directory information thereof and a database searcher for acquiring data of the database provider and displaying the data of the database provider to a user on the basis of the directory information of the directory information provider. The directory information provider provides scenario information composed of main information presenting sequence control information for arranging position information of the main information to be output/displayed to a user of the database searcher on a time axis, secondary information presenting sequence control information for inserting a secondary information into the main information and outputting/displaying it and presenting control information for controlling insertion timing of the secondary information into the main information. The database searcher comprises means for inserting the secondary information into the main information on the basis of the scenario information of the directory information provider and outputting/displaying the secondary information.

In the fifth aspect, the present invention is applied to the database search using the Internet. The directory information provider provides the scenario information for controlling the position information and the arranging sequence of the position information and the database searcher inserts the secondary information into the main information on the basis of the scenario information and outputs/displays them to the user.

The user can watch various information retrieved through the Internet and automatically displayed successively on the basis of the scenario information, in such a way that he watches a television program or picture-card show.

Incidentally, the secondary information is the so-called advertisement information. The advertisement information of an advertisement provider is inserted into the main information and the main information having the commercial message inserted thereinto is output/displayed like the television program (either a still picture or a moving picture). With respect to the output/display of the secondary information, it is possible to add a forcible display function for preventing the user from fast-feeding or jumping the commercial message.

DETAILED DESCRIPTION OF THE PREFERRED EMBODIMENTS

An embodiment of the present invention will be described with reference to the drawings.

Figure 1:
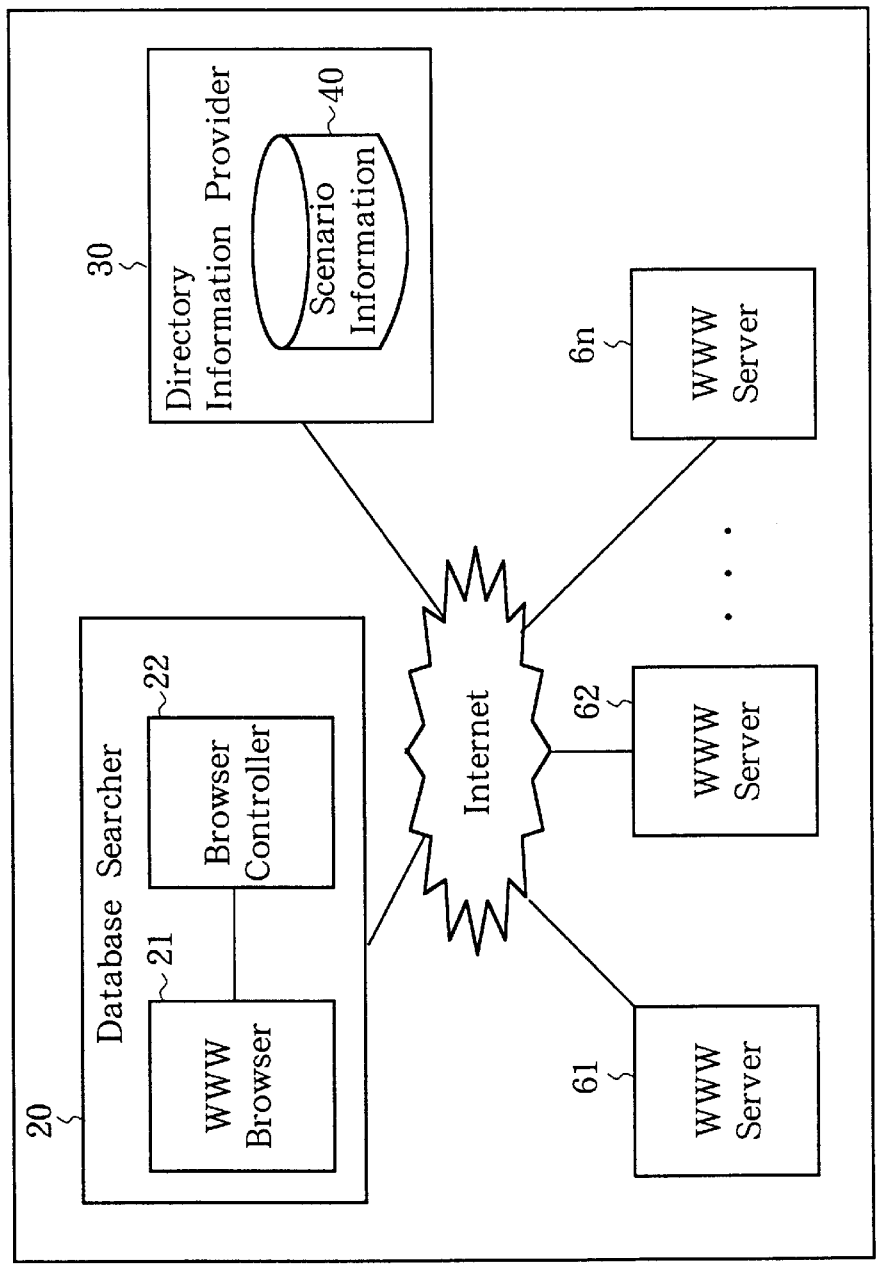
FIG. 1 illustrates a conventional database search system on the basis of a scenario information.
Figure 2:
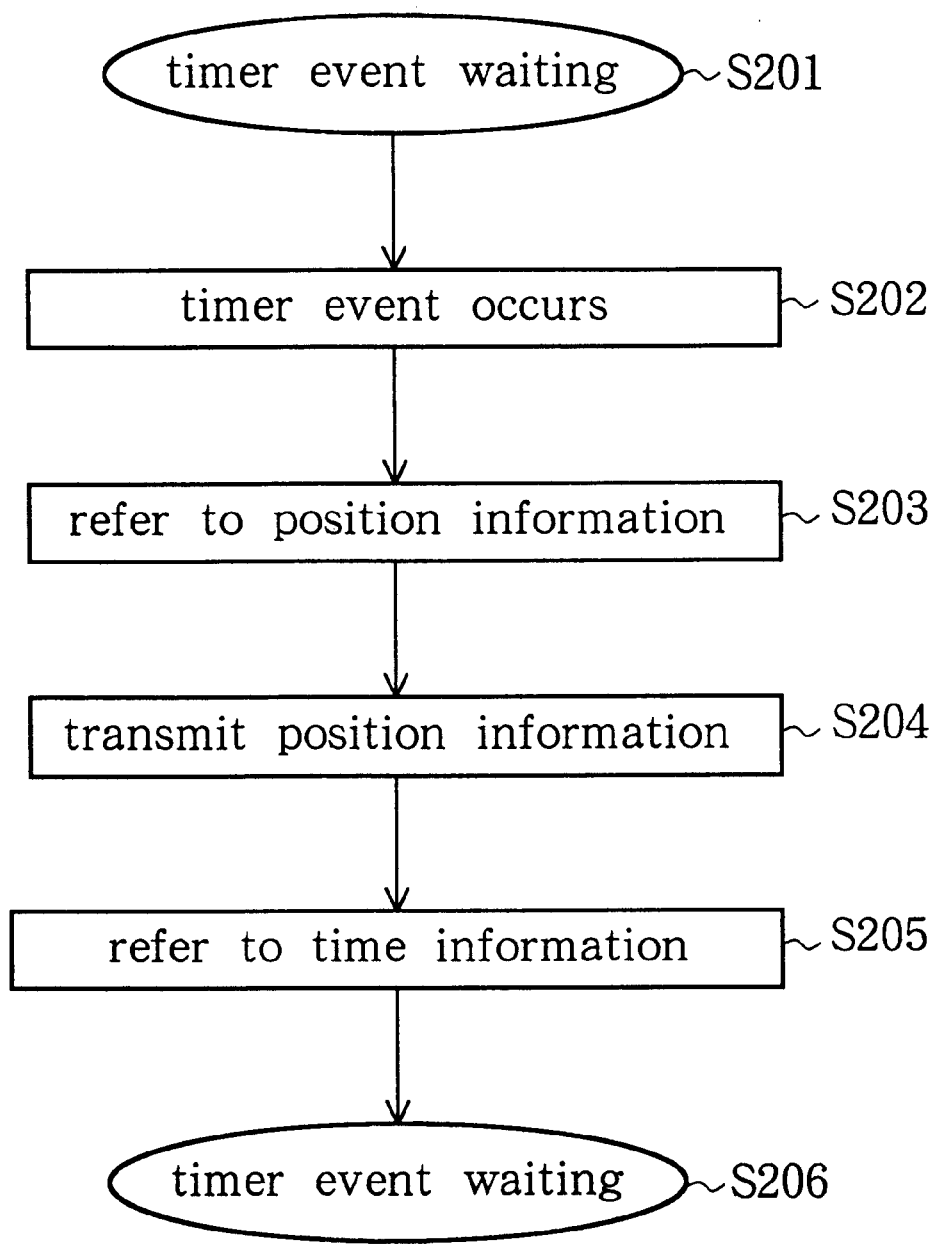
FIG. 2 is a flowchart of an operation of a conventional directory information provider.
Figure 3:
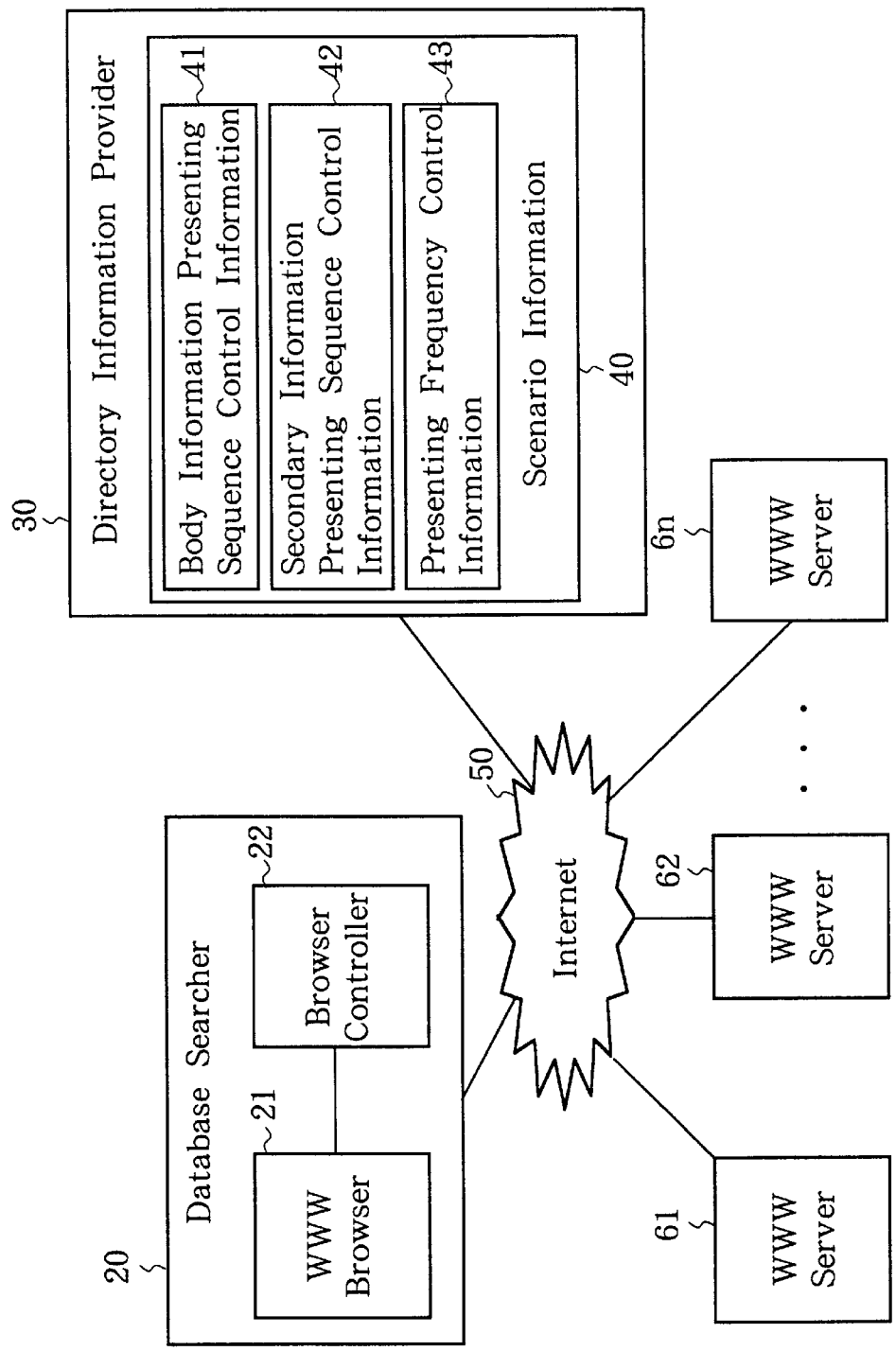
FIG. 3 shows a construction of a database search system according to an embodiment of the present invention.

FIG. 3 shows an example of a system construction of a database search system according to the present invention in which the present invention is applied to a case where a WWW (World Wide Web) server is searched by utilizing WWW browsers on an Internet.

The database search system comprises WWW servers 61, 62, ..., 6n which are WWW database providers connected to the Internet 50, a directory information provider 30 for searching position information of data on the Internet and providing directory information thereof and a database searcher 20 for acquiring data of the WWW servers 61, 62, ..., 6n on the basis of the directory information of the directory information provider 30 and displaying it to a user. The directory information provider 30 provides scenario information 40 composed of main information presenting sequence control information 41 for arranging position information of a main information to be output/displayed to a user of the database searcher 20 on a time axis, secondary information presenting sequence control information 42 for inserting secondary information into an output/display of the main information and a presenting frequency control and information 43 for controlling the insertion timing of the secondary information for controlling insertion timing of the secondary information into the main information. The database searcher 20 comprises a WWW browser 21 and a browser control means as means for inserting the secondary information into the main information based on the scenario information 40 of the directory information provider 30.

Figure 4:
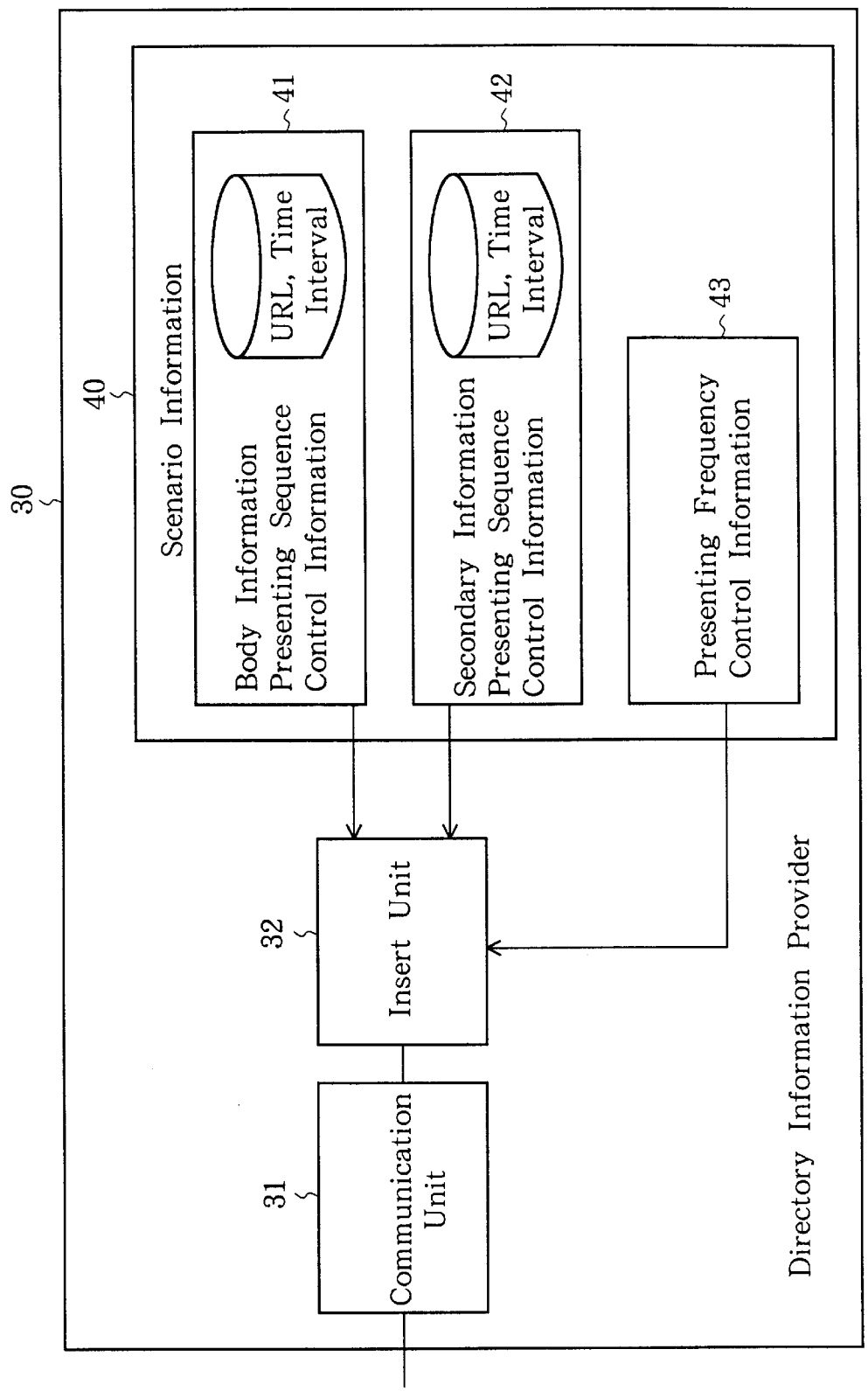
FIG. 4 is a block diagram showing an example of a construction of a directory information provider of the database search system shown in FIG. 3.

FIG. 4 shows an example of the construction of the directory information provider 30 which includes a communication unit 31 for communicating with the network, an insert unit 32 for inserting the secondary information into the main information and supplying the main information together with the secondary information to the communication unit 31 and a memory unit for storing the scenario information 40. The scenario information 40 is composed of an information position information (URL) and time information and includes, as information of a presenting scenario of search information, the main information presenting sequence control information 41, the secondary information presenting sequence control information 42 and the presenting frequency control information 43. The main information presenting sequence control information 41 takes in the form of a main information described with the position information (URL) of the main information and the time information and arranged on a time axis. Similarly, the secondary information presenting sequence control information 42 takes in the form of secondary information described with the position information (URL) of the secondary information and the time information and arranged on a time axis.

This embodiment is featured, with respect to the conventional scenario information 40 which is constructed with only the position information and the time information and in which the main information presenting scenario is not separated from the secondary information presenting scenario, in that the main information presenting sequence control information 41 and the secondary information presenting sequence control information 42 are separated and the scenario is that the insertion of the secondary information into the main information is controlled on the basis of the presenting frequency control information 43.

An operation of this embodiment will be described with reference to FIG. 5 which shows a flowchart of an operation of the directory information provider and FIGS. 6 and 7 which show examples of secondary information inserting operations based on a scenario information.

Figure 5:
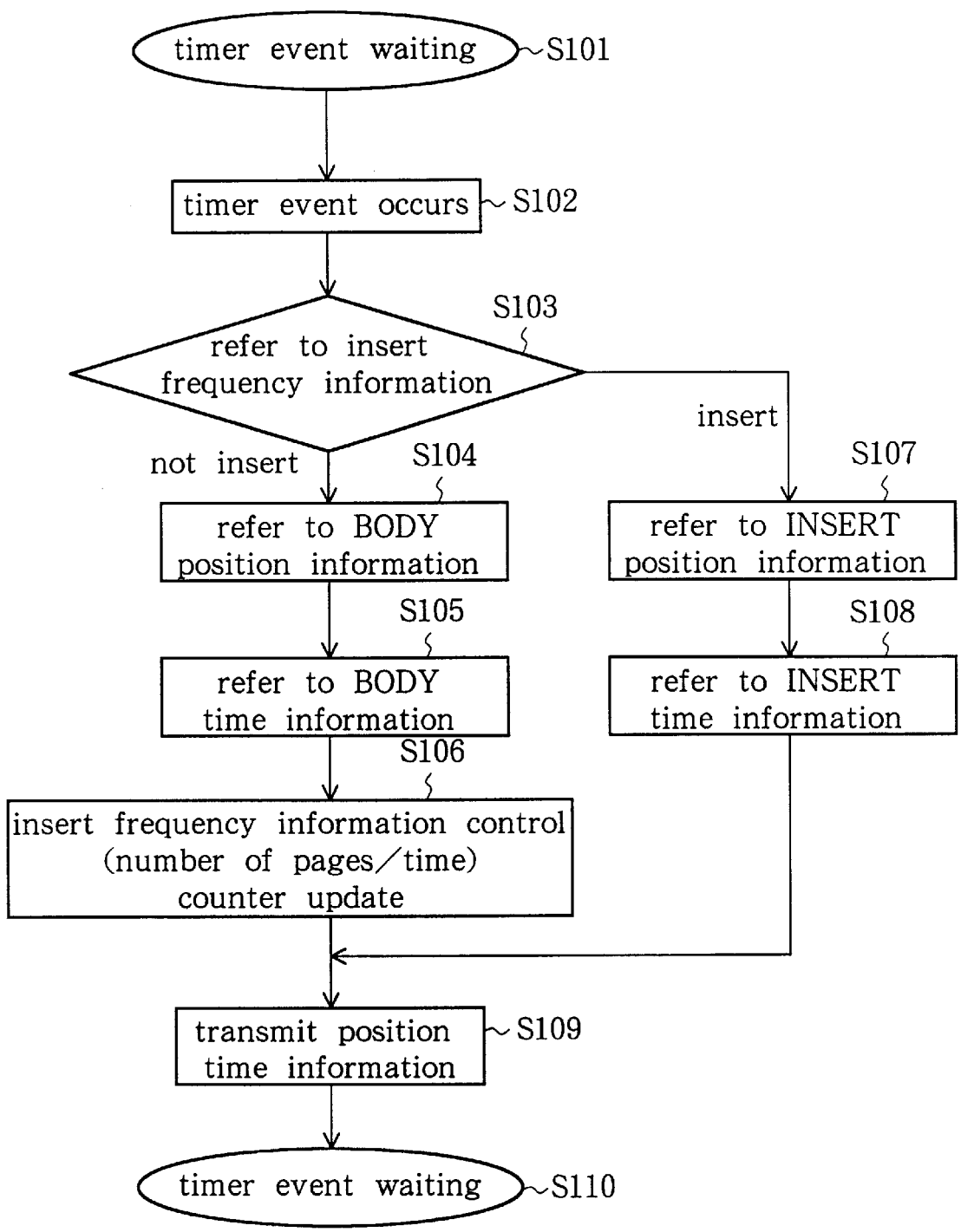
FIG. 5 is a flowchart of an operation of the directory information provider.
Figure 6:
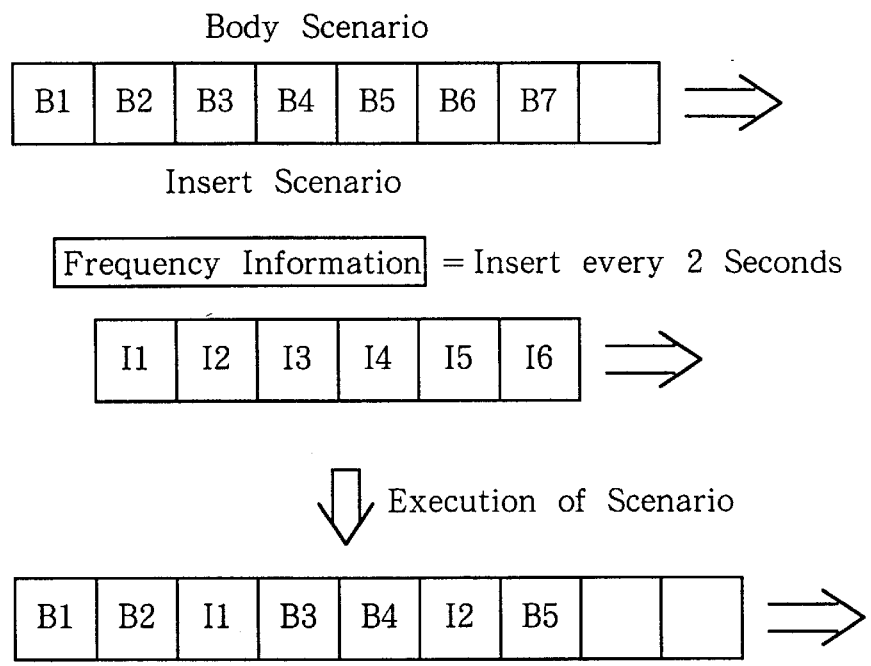
FIG. 6 is a flowchart of a secondary information inserting operation based on a scenario information.

Referring to FIG. 5, the directory information provider 30 is initially in a timer event waiting state (step S101). When a timer event occurs (step S102), the directory information provider 30 determines whether or not the secondary information is to be inserted into the main information by referring to the insert frequency information of the presenting frequency control information 43 (step S103). When it is decided that the secondary information is not to be inserted into the main information, the directory information provider 30 refers to the main information position information (step S104) and to the body time information (step S105) to update the insert frequency information control counter (step S106), transmits the position information of the body information and the time information (step S109) and enters into the timer event waiting state (step S110).

The update of the insert frequency information control counter is performed by updating a time measuring counter (timer) when the insert frequency control information is described such that the secondary information is inserted at intervals of some seconds or by updating the page number counter when the insert frequency control information is described such that the secondary information is inserted at intervals of some pages of the body information.

When it is decided by referring to the insert frequency information in the step S103 that the secondary information is to be inserted, the directory information provider 30 refers to the secondary information (insert position information) (step S107) and to insert time information (step S108) and transmits the position of the secondary information and the time information (step S109). Then, it becomes the timer event waiting state (sep S110).

Examples of insertion of the secondary information will be described with reference to FIGS. 6 and 7. FIG. 6 shows an example in which the insert frequency information is described such that the secondary information is inserted every 2 pages of the main information. The main information is arranged on the time axis as B1, B2, ... on the basis of the scenario of the information presenting sequence control information 41. On the other hand, the secondary information to be inserted into the main information is arranged on the time axis as I1, I2, ... on the basis of the scenario of the secondary information presenting sequence control information 42. The main information B and the secondary information I indicate position information (URL), respectively, and correspond to one file. Since the insert frequency information of the presenting frequency control information 43 indicates that the secondary information is inserted every 2 pages of the main information, a resultant train of information becomes B1, B2, I1, B3, B4, I2, B5, ... as shown in FIG. 6.

Figure 7:
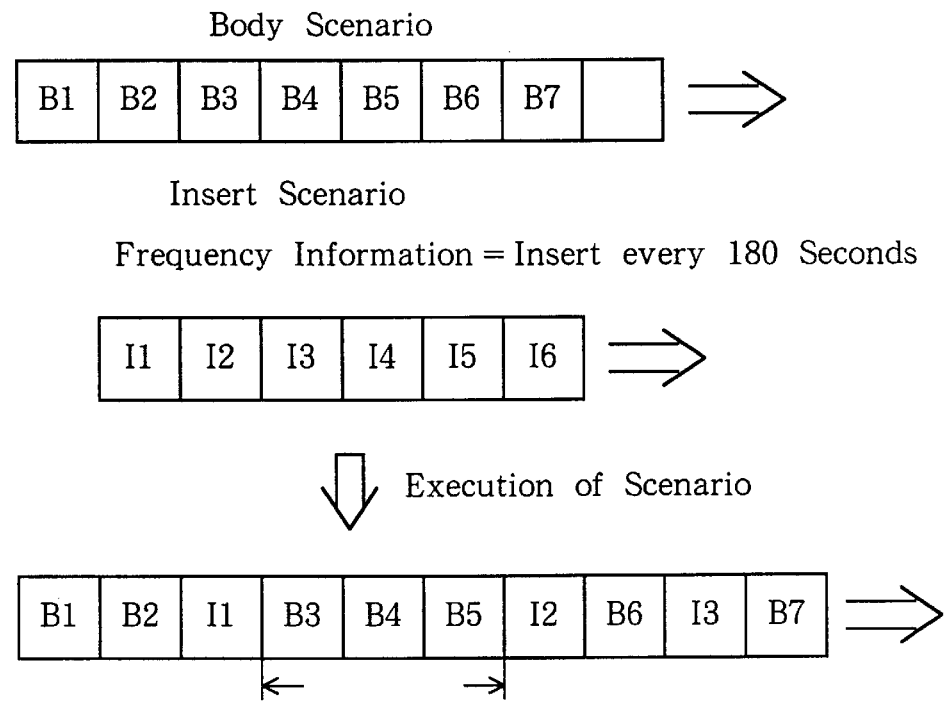
FIG. 7 is another flowchart of a secondary information inserting operation based on a scenario information.

FIG. 7 shows an example in which the insert frequency information is described such that the secondary information is inserted into the main information every 180 seconds. That is, the secondary information is inserted into the main information every 180 seconds regardless of the number of pages of the displayed main information and is displayed to the user.

Although it is described in the above example that the presenting frequency control information is described to insert the secondary information into the position information of the main information every predetermined time or every predetermined number of pages of the main information, it is possible to control the presentation in such a way that specific secondary information is displayed according to a content of the main information under display. For example, when specific information is displayed as the main information, it is possible to perform an insert control such that specific secondary information related to the specific main information is displayed subsequent to the display of the specific main information.

Figure 8:
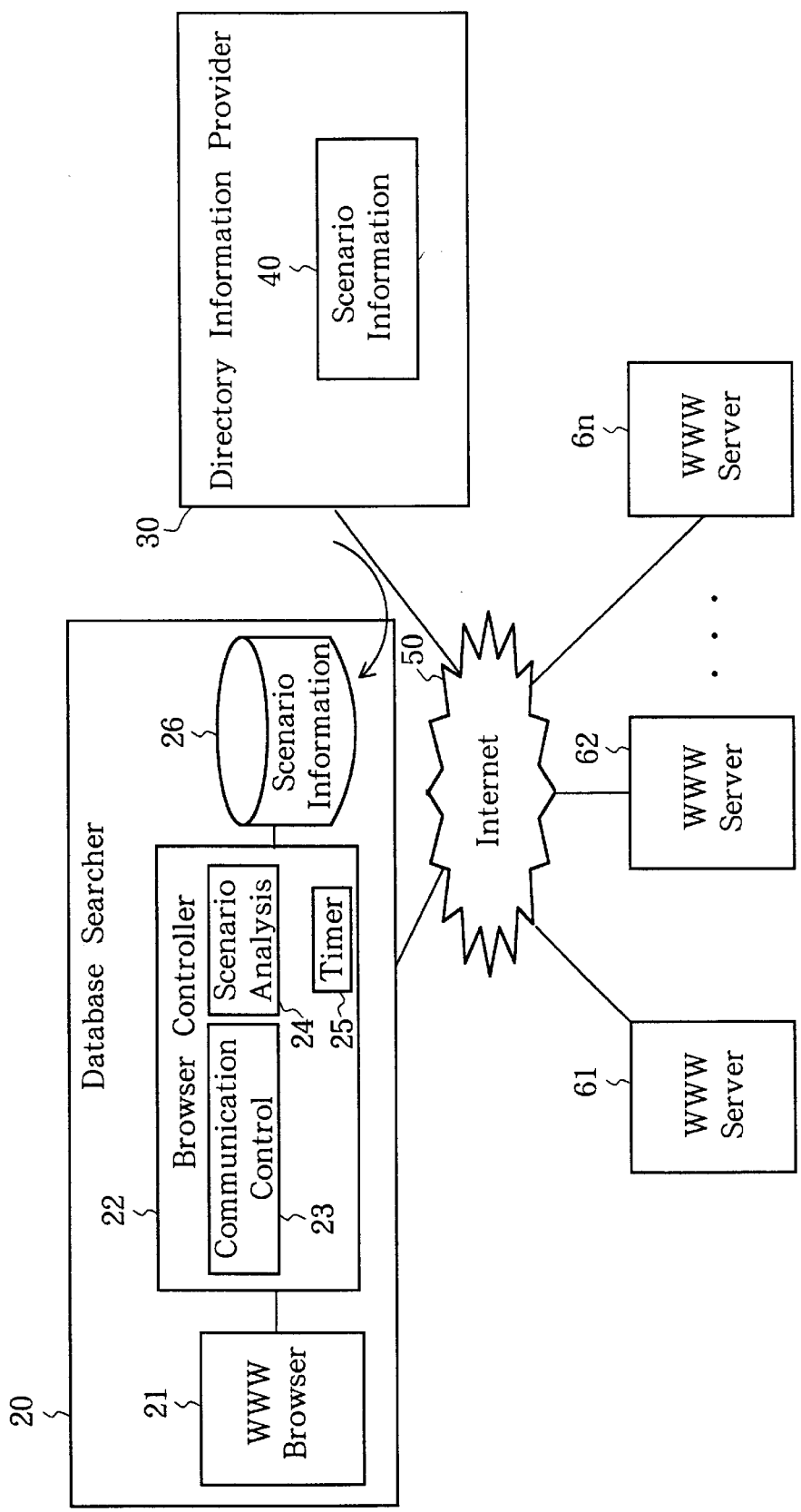
FIG. 8 illustrates a database search system performing a database search by down-loading the scenario information.

Now, another embodiment of the present invention will be described with reference to FIG. 8, in which the database search is displayed by down-loading the scenario information from the directory information provider 30 to the database searcher 20.

In the database search utilizing the Internet, it is usual to perform the search by putting a database search software in a terminal connected to the Internet or down-loading it from the directory information provider. Therefore, the second embodiment will be described with respect thereto.

First, the user down-loads the scenario information 40 by accessing the directory information provider 30 from the database searcher 20 and stores the scenario information in its own memory as a scenario information 26. When information is to be displayed by performing the database search, the user acquires the position information of the main information and the secondary information by analyzing the scenario information 26 by a scenario analyzer 24 of a browser controller 22, acquires a search information (file) from a WWW server 61, 62 . . . , or 6n and outputs the main information through a communication device 23 to a WWW browser 21 while inserting the secondary information into the main information. The WWW browser 21 displays the information retrieved under control of the browser controller 22. A timer 25 is used for the time control of information to be displayed and the time control when the secondary information is inserted into the main information every predetermined time. The user can read the main information inserted with the secondary information every predetermined time by the WWW browser 21. Incidentally, in a case where the secondary information is inserted into the main information correspondingly to the number of display pages of the main information, the number of pages of the main information is counted by providing a page counter. Although, in the described embodiment, the database search is performed in the Internet as the network, the present invention can be applied to other networks. For example, the present invention can be applied to the database search/display in a network which is constructed with a plurality of servers and a client connected to each other through a transmission line and databases distributed in the servers, a network in a specific enterprise or other closed networks.

Incidentally, in the above mentioned embodiment, advertisement information is output/displayed as the secondary information. The advertisement in the Internet has been called as banner advertisement which is displayed in a portion of a display screen or displayed on the screen only when the user clicks. Therefore, the effect of advertisement is not so strong. However, in the present invention, since the main information inserted with the secondary information is output/displayed without fail, the present invention is very advantageous in performing the advertisement business and capable of ensuring benefit of the advertisement provider.

Describing the forcible display of the secondary information, when a user reads a home page in the Internet according to the scenario, a control panel such as fast feed or pause of the display, etc., is usually displayed and the user can fast-feed or pause the display by operating the control panel. Thus, even when an advertisement information is inserted into a main information, the insertion of advertisement information becomes meaningless if the user fast-feeds or pauses the display of advertisement information by operating the control panel. As a countermeasure against such situation, the function of forcing the user to read a page of the secondary information for a constant time is given by the present invention.

The above mentioned function is to invalidate the function of the control panel as to the position information of the secondary information, during the display time of the secondary information, by setting the attribute of the secondary information such that the control panel is not displayed during the time for which the secondary information is displayed so that the user can not operate the control panel to perform a fast-feed or jump of the secondary information during the display time thereof. Thus, it is possible to reliably show the user the secondary information such as advertisement.

As described hereinbefore, according to the present invention, the directory information services capable of providing the secondary information such as advertisement, etc., similarly to the television broadcasting is provided by automatically inserting the secondary information into the main information and it is possible to develop the push type information services on the network, like television broadcasting expecting advertising revenue.

Particularly, in the present invention, the scenario of the main information and that of the secondary information are separately produced and can be updated/changed independently from each other. Therefore, the update/change work of the scenarios, particularly, the change of the secondary information which is advertisement information to be changed frequently, are facilitated. Further, the freedom of advertisement insertion is large, appealing to the user.

Therefore, it is possible to insert the advertisement, etc., in the WWW server of the Internet as the secondary information and the database provider can expect the advertising revenue.

Further, since it is possible to forcibly display a predetermined information assigned by the scenario, for example, the advertisement information which is the secondary information, and to seek the advertisement provider's benefit, it is easy for the database provider to get the advertising revenue and expect the development of the business.

What is claimed is:

1. A database search/display method, comprising the steps of:

retrieving information of databases distributed on a network;

outputting/displaying the retrieved information according to an information presenting sequence control information for arranging/outputting the retrieved information on a predetermined time axis, wherein the information presenting sequence control information contains main information presenting sequence control information, secondary information presenting sequence control information and insert control information for controlling insert timing of the secondary information, wherein the secondary information is inserted onto the time axis for the main information according to the insert control information, and wherein the insert control information is described such that the secondary information is inserted into the main information at a predetermined amount of the main information displayed.

2. A database search/display method, comprising the steps of:

retrieving information of databases distributed on a network;

outputting/displaying the retrieved information according to an information presenting sequence control information for arranging/outputting the retrieved information on a predetermined time axis, wherein the information presenting sequence control information contains main information presenting sequence control information, secondary information presenting sequence control information and insert control information for controlling insert timing of the secondary information, wherein the secondary information is inserted onto the time axis for the main information according to the insert control information, and wherein the secondary information is set such that an operation of a control panel by a user is invalidated for a time when the secondary information is displayed.

3. A database search system comprising:
a directory information provider, said directory information provider comprising:
  position information memory means for storing a position information of a main information and a position information of a secondary information to be inserted into an output/display of the main information, for a plurality of data stored in databases distributed in a network;
  position information presenting sequence control means for inserting the position information of the secondary information into the position information of the main information on the basis of the presenting sequence information of the main information, the presenting sequence information of the secondary information and the presenting control information for controlling a fiming of an insertion of the position information of the secondary information into the position information of the main information and arranging/outputting the position information on a time axis; and
  means for transmitting a memory content of said position information memory means and the presenting sequence control information comprised of the presenting sequence control information of the main information and the presenting sequence control information of the secondary information of said position information presenting sequence control means and the presenting control information to said database searcher connected to a network; and
means included in said database searcher, for acquiring the main information and the secondary information from databases distributed in said network on the basis of the position information and the presenting sequence control information from said directory information provider, inserting the thus acquired directory information into the thus acquired main information and outputting/displaying the main information inserted with the secondary information,
wherein the secondary information is advertisement information inserted to said database provider and a setting is performed for the secondary information, for invalidating a display inhibition on the side of a user.

4. A database search system in which clients and servers are connected to a network, comprising:
a directory information providing server, said directory information providing server comprising means for inserting position information of main data in one of a plurality of databases distributed on said network and position information of secondary information of said database to be inserted into an output/display of the main data to the side of said client at a predetermined interval or predetermined information amount on the basis of presenting control information for controlling insertion timing of the secondary information and transmitting the main data inserted with the secondary information to said client; and
means included in said client, for retrieving the position information of the main and secondary information from said database on said network on the basis of the information from said directory information providing server and outputting/displaying the main and secondary information while inserting the secondary information into the main information according to the predetermined interval or predetermined information amount.

5. A database search system in which clients and servers are connected to a network comprising:
a directory information providing server said directory information providing server comprising means for inserting position information of main data in one of a plurality of databases distributed on said network and position information of secondary information of said database to be inserted into an output/display of the main data to the side of said client at a predetermined interval or predetermined information amount on the basis of presenting control information for controlling insertion timing of the secondary information and transmitting the main data inserted with the secondary information to said client; and
means included in said client, for retrieving the position information of the main and secondary information from said database on said network on the basis of the information from said directory information providing server and outputting/displaying them while inserting the secondary information into the main information,
wherein the secondary information is advertisement information inserted into said database providing server and the secondary information is set such that the display inhibition on the side of the user is invalidated.

6. A database search system comprising:
a World Wide Web database provider connected to the Internet;
a directory information provider for retrieving position information of data on the Internet and providing directory information thereof; and
a database searcher for acquiring data of said database provider and displaying the data of said database provider to a user on the basis of the directory information of said directory information provider,
said directory information provider comprising means for providing scenario information comprised of main information presenting sequence control information for arranging position information of the main information to be output/displayed to a user of the database searcher on a time axis, secondary information presenting sequence control information for inserting secondary information into the main information and outputting/displaying it and presenting control information for controlling insertion timing of the secondary information into the main information,
said database searcher comprising means for inserting the secondary information into the main information on the basis of the scenario information of said directory information provider and outputting/displaying the secondary information,
wherein the secondary information is advertisement information inserted into said database providing server and the secondary information is set such that the display inhibition on the side of the user is invalidated.

* * * * *